United States Patent
Pandey (10) Patent No.: US 11,124,690 B2
(45) Date of Patent: Sep. 21, 2021

(54) LEAK-OFF CONTROL IN ACID STIMULATION USING DISSOLVABLE MATERIAL

(71) Applicant: ConocoPhillips Company, Houston, TX (US)

(72) Inventor: Vibhas Pandey, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 191 days.

(21) Appl. No.: 16/559,698

(22) Filed: Sep. 4, 2019

(65) Prior Publication Data

US 2020/0095492 A1    Mar. 26, 2020

Related U.S. Application Data

(60) Provisional application No. 62/734,965, filed on Sep. 21, 2018.

(51) Int. Cl.
| | | |
|---|---|---|
| C09K 8/508 | (2006.01) | |
| C09K 8/68 | (2006.01) | |
| C09K 8/76 | (2006.01) | |
| E21B 33/138 | (2006.01) | |
| E21B 43/26 | (2006.01) | |

(52) U.S. Cl.
CPC .............. *C09K 8/5086* (2013.01); *C09K 8/68* (2013.01); *C09K 8/76* (2013.01); *E21B 33/138* (2013.01); *E21B 43/26* (2013.01); *C09K 2208/08* (2013.01); *C09K 2208/26* (2013.01); *C09K 2208/28* (2013.01)

(58) Field of Classification Search
CPC .......... C09K 8/5086; C09K 8/68; C09K 8/76; C09K 2208/08; C09K 2208/26; C09K 2208/28; E21B 33/138; E21B 43/26
See application file for complete search history.

(56) References Cited

U.S. PATENT DOCUMENTS

| | | | |
|---|---|---|---|
| 4,007,789 A | 2/1977 | Clampitt et al. | |
| 4,107,057 A | 8/1978 | Dill et al. | |
| 5,238,067 A | 8/1993 | Jennings, Jr. | |
| 7,148,184 B2 | 12/2006 | Francini et al. | |
| 7,166,560 B2 | 1/2007 | Still et al. | |

(Continued)

FOREIGN PATENT DOCUMENTS

| | | |
|---|---|---|
| GB | 2493299 | 3/2013 |
| IN | 260CHENP2006 | 6/2007 |

(Continued)

OTHER PUBLICATIONS

International Search Report, PCT/US2019/049411, dated Nov. 20, 2019, 3 pages.

(Continued)

*Primary Examiner* — Crystal J Miller
(74) *Attorney, Agent, or Firm* — Boulware & Valoir (57) ABSTRACT

Reducing leak-off during acid stimulation with dissolvable material sized to preferentially block crevices and wormholes, thus allowing the acid to travel further down the fractures, etching deeper into the reservoir than a similar process not using such dissolvable materials. After stimulation, the materials dissolve and production can proceed and will be improved over what is possible without such dissolvable materials.

22 Claims, 5 Drawing Sheets

(56) References Cited

U.S. PATENT DOCUMENTS

| | | | |
|---|---|---|---|
| 7,219,731 B2 | 5/2007 | Sullivan et al. | |
| 7,690,429 B2 | 4/2010 | Creel et al. | |
| 8,042,614 B2 | 10/2011 | Sullivan et al. | |
| 8,726,991 B2 | 5/2014 | Boney | |
| 9,920,610 B2 | 3/2018 | Nelson et al. | |
| 2002/0023752 A1* | 2/2002 | Qu | E21B 43/26 166/308.1 |
| 2003/0139298 A1* | 7/2003 | Fu | C09K 8/74 507/200 |
| 2004/0152601 A1 | 8/2004 | Still et al. | |
| 2006/0175059 A1 | 8/2006 | Sinclair et al. | |
| 2013/0105159 A1 | 5/2013 | Alvarez et al. | |
| 2015/0041132 A1 | 2/2015 | Nelson et al. | |
| 2015/0275615 A1 | 10/2015 | Rytlewski et al. | |
| 2016/0003022 A1* | 1/2016 | Rothrock | C09K 8/467 166/280.2 |
| 2016/0108713 A1 | 4/2016 | Dunaeva et al. | |
| 2016/0122618 A1* | 5/2016 | Nguyen | C09K 8/03 166/307 |
| 2018/0079901 A1 | 3/2018 | Yun et al. | |

FOREIGN PATENT DOCUMENTS

| | | |
|---|---|---|
| IN | 257335 | 9/2013 |
| WO | 2009104978 | 8/2009 |

OTHER PUBLICATIONS

Williams, B.B. et al., 1979. Acidizing Fundamentals, 55. New York: SPE/AIME.

\* cited by examiner

LEAK-OFF CONTROL IN ACID STIMULATION USING DISSOLVABLE MATERIAL

PRIOR RELATED APPLICATIONS

This application claims priority to U.S. Ser. No. 62/734,965, filed Sep. 21, 2018, and incorporated by reference in its entirety for all purposes herein.

FEDERALLY SPONSORED RESEARCH STATEMENT

Not applicable.

FIELD OF THE DISCLOSURE

This invention provides methods to control the loss of acid stimulation fluids into subterranean formations during acid fracturing stimulation of a reservoir. Controlling loss results in longer acid penetration lengths and makes the stimulation treatment more efficient in improving well productivity.

BACKGROUND OF THE DISCLOSURE

Oil and gas reservoirs are often "hydraulically fractured" in order to stimulate the production of hydrocarbon from the reservoir. Typically, a fluid is pumped downhole under pressures that exceed the strength of the formation, resulting in fracturing of the rock—the resulting fractures providing conduits for fluid flow to the well.

Fluid, usually a viscous fluid not containing any solid (called the "pad"), is injected first, until the fracture is wide enough to accept a propping agent. Then a viscous fluid with proppant is pumped downhole. The purpose of the propping agent or proppant is to keep apart the fracture surfaces once the pumping operation ceases, the viscous fluid serving to carry the proppant. In deep reservoirs, man-made ceramic beads are used to hold open or "prop" the fracture, and in shallow reservoirs, sand is normally used as the proppant.

Figure 1A:
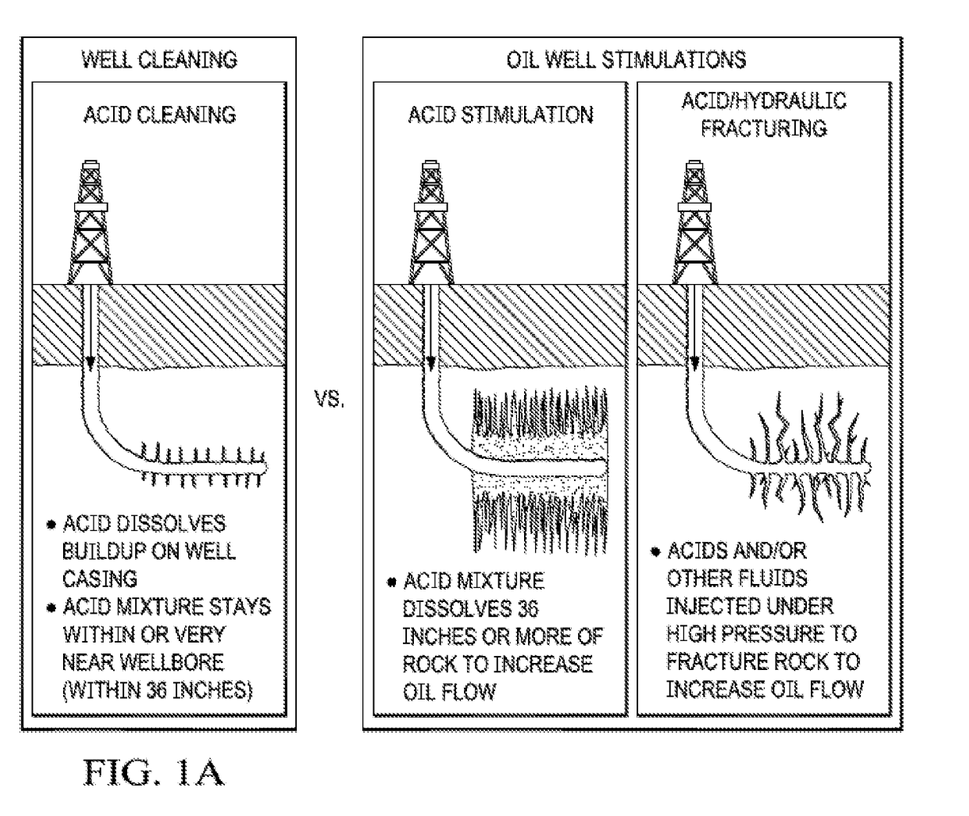
FIG. 1A. Various acid treatments.

Acid fracturing (see third panel in FIG. 1A) is another technique that is sometimes used for carbonate-rich plays. Although many formations in North America are sandstone and require the use of granular propping agents, acid fracturing is more commonly used in Europe and the Middle East, especially in Bahrain and Saudi Arabia, where carbonate plays are common. For the channels to form, the formation is preferably limestone, dolomite, or chalk with a total carbonate content of at least 60%.

At the end of the fracturing process, the high pressure in the fracture is relieved and earth stresses force the fracture to close. Differential etching from uneven dissolution of the carbonate fracture face is expected to occur with local high spots, termed asperities, sustaining the deeply etched portions of the fracture during fracture closure and subsequent production. Therefore, the acid fracturing process requires rock heterogeneity to work. If the carbonate rock were uniform, the etching would be uniform and the fracture would close off completely, leaving no conductivity.

The reactions of HCl by carbonate (1) and dolomite (2) are shown:

$$2HCl + CaCO_3 \rightarrow CaCl_2 + H_2O + CO_2 \qquad (1)$$

$$4HCl + CaMg(CO_3)_2 \rightarrow CaCl_2 + MgCl_2 + 2H_2O + CO_2 \qquad (2)$$

The most commonly used fluid in acid fracturing is 15% hydrochloric acid (HCl). A 28% HCl is sometimes used as the primary acid fluid to obtain more acid penetration and more etching, but it is more hazardous as well as more expensive. On occasion, formic acid (HCOOH) or acetic acid (CH$_3$COOH) are used because these acids are easier to inhibit under high-temperature conditions. However, acetic and formic acid cost even more than HCl. Blends can also be used—for example 13% acetic and 9% formic acid has approximately the same dissolving power as 8% HCl. Other variations include gelled acid, crosslinked acid, foamed acid, encapsulated acid, slick acid, and the like.

Typically, a gelled water or crosslinked gel fluid is used as the pad fluid to fill the wellbore and break down the formation. The water-based pad is pumped to create the desired fracture height, width, and length for the hydraulic fracture. Once the desired values of created fracture dimensions are achieved, the acid is then pumped and fingers down the fractures to etch the walls of the fractures thus increasing fracture conductivity, and allowing the fractures to remain even when the pressure is reduced.

Because the acid is very reactive with the carbonate, fluid loss is a primary consideration in the fluid design. The acid is normally gelled, crosslinked, emulsified, or foamed to maintain fracture width and minimize fluid leak-off. Large amounts of fluid-loss additives are generally added to the acid fluid to minimize fluid leak-off. Fluid loss control agents are expensive, however, and not as effective as desired.

Figure 1B:
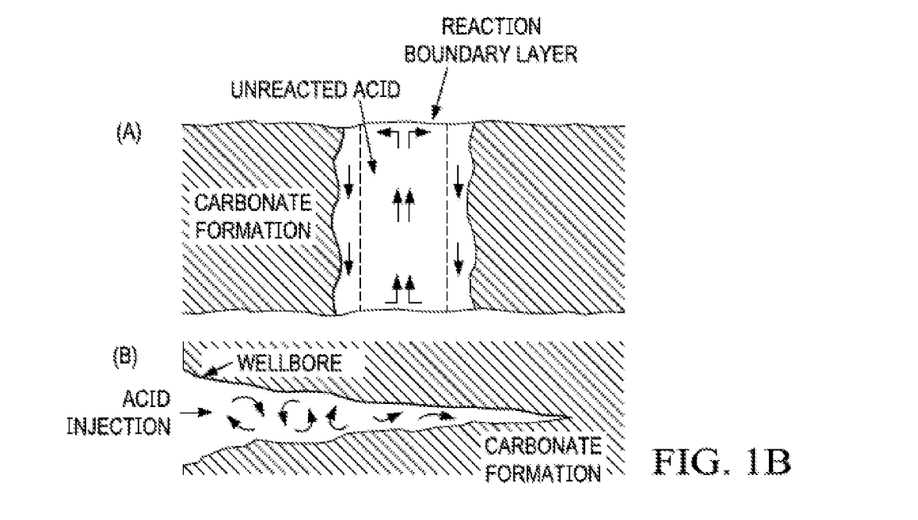
FIG. 1B Acid-flow behavior in wide (a) and narrow (b) fractures.

FIG. 1B (from Williams 1979) illustrates why the design engineer should be striving to create a wide fracture. If a wide fracture is created (panel a) with a viscous acid and minimal fluid loss, then a boundary layer of spent acid products will reduce the rate at which the live acid contacts the formation at the walls of the fracture. However, as the flow in the fracture becomes more turbulent and less laminar, as in a narrow fracture (panel b) the live acid will contact the walls of the fracture more easily, and the acid will not penetrate very far into the fracture before becoming spent.

Figure 2:
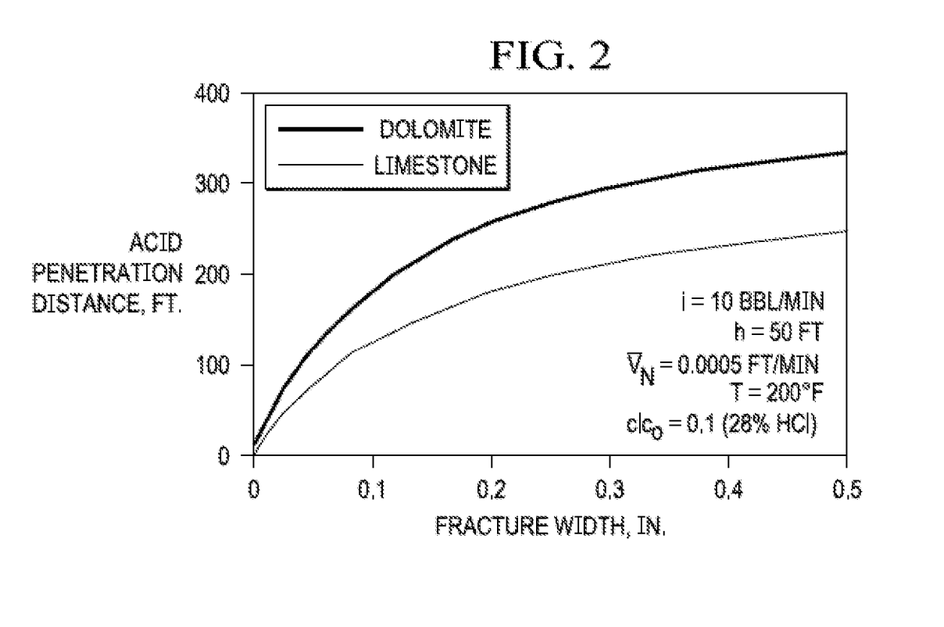
FIG. 2. Effect of fracture width on acid-penetration distance.

Factors such as fracture width, injection rate, acid viscosity, and reservoir temperature also affect the degree of acid penetration. FIG. 2 (Williams, 1979) illustrate how fracture width and formation temperature affect acid penetration in the fracture, respectively. As the fracture width increases, the distance that unspent acid will reach in the fracture also increases. The distance increases because in a wider fracture there is less turbulence. This results in less mixing as the live acid moves down the fracture, allowing the boundary layer to provide protection and extend the life of the acid. Therefore, the viscosity and leak-off properties of the fracture fluid should be controlled to maximize fracture width.

Figure 3:
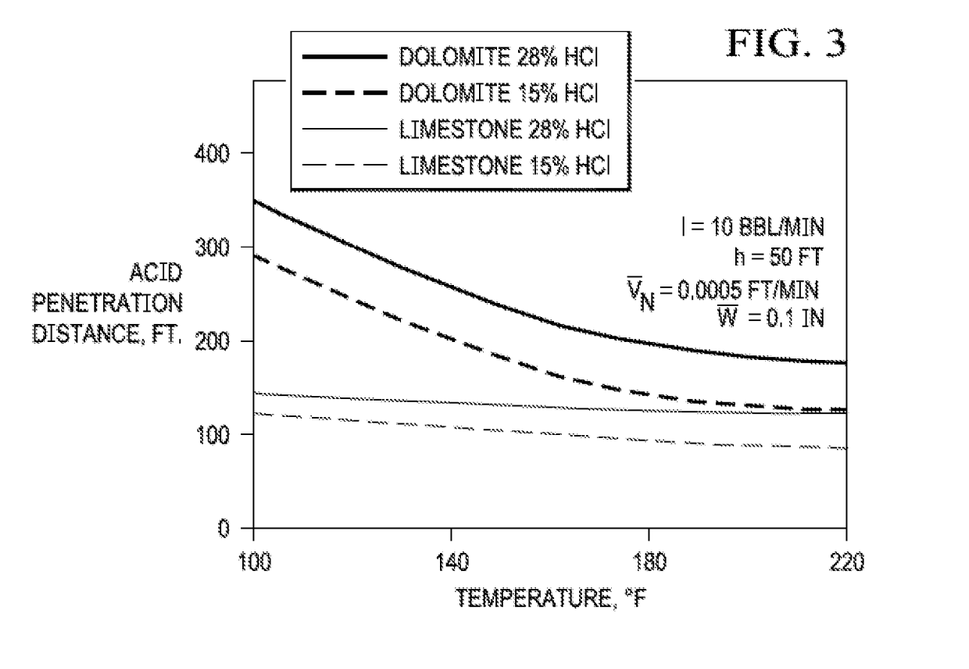
FIG. 3. Effect of temperature, lithology, and acid concentration on acid-penetration distance.

FIG. 3 illustrates the effects of reservoir temperature, acid strength, and formation lithology on acid fracking. It is clear that the use of higher-strength acid increases the penetration distance in the fracture before the acid spending. Also, as temperature increases, the acid penetration distance decreases. This is because as the temperature increases, the reaction rates between the acid and the formation increase substantially. In fact, the reaction rate doubles with every 18° F. increase in temperature. Dolomite is less reactive with HCl than limestone; therefore, acid fracturing may work slightly better in reservoirs that are more highly dolomitized.

As used herein, a "wormhole" is a large, empty channel that can penetrate several feet into the formation, caused by the non-uniform dissolution of limestone or dolomite by hydrochloric or other acid. Wormholes are created during matrix stimulation (middle panel of FIG. 1A) or acid fracturing (right panel) of carbonate formations. The purpose of matrix stimulation is to create highly conductive wormholes to bypass damage. However, in fracture acidizing, wormholing is a problem, since it allows an unwanted diversion of the live acid from the hydraulic fracture system, which causes a reduction of the etched fracture length.

Although we understand the factors that increase acid reactivity and even though fluid loss control agents are available, leak-off continues to present a significant problem. Even a modest prevention of leak-off will improve the efficiency and cost of acid fracturing, and can mean the difference between commercially viable production and trapped reserves that are not cost effective to produce. This application addresses one or more of those needs.

SUMMARY OF THE DISCLOSURE

Acid fracturing is one of the preferred modes of well stimulation for low permeability, acid-soluble formations. In the acid fracturing process, fractures are first hydraulically generated by pumping an inert fluid at the pressures above the fracture pressure of the formation, in a fluid-stage sequence termed as the "pad." Once the hydraulic factures are created, acid is then pumped into the wellbore, still at high pressure, to contact the rock and start the dissolution process to create differential etching that leads to more conductive fractures.

As the acid-limestone contact takes place, the dissolution process begins. As the rock continues to dissolve and the material is continuously removed from the rock matrix, the porous structure of rock is often altered and can result in increased leak-off of fluid into the formation. The increase in leak-off at the end of first acid cycle in the pump schedule is controlled to some extent by introduction of additional pad cycle(s) immediately following the acid stage.

However, due to the nature of hydraulic fracturing, effective leak-off mechanisms that are primarily associated with fluid and formation properties and pumping conditions, such as leak-off control via wall building (filter cake formation), via filtrate and formation viscosity, via formation compressibility, may not be sufficient to restrict the loss of fluid to the formation in the near well region. Because of this, acid penetration is often limited to regions near the wellbore. Near wellbore acid spending results in (a) shorter acid-etched fracture lengths leading decreased productivity from the well, and (b) excessive dissolution of rock material in near well region, which can also lead to well integrity issues in late life of the well.

We have addressed this issue herein by employing dissolvable fibers and/or particulates in a downhole treatment. A slurry is made of the dissolvable material, and is pumped downhole with an intention to temporarily plug-off the wormholes formed during acid-reservoir rock interaction, thus reducing the leak-off potential. This material is also referred to as "leak-off control agent" herein.

The material used for this purpose is fully degradable when exposed to certain conditions of temperature for a given duration of time, in presence of aqueous media. Dissolution characteristics of such material are available from vendors and dictates the choice of material selected for the treatment.

Material size, e.g. between 5-150 or 10-100 or 20/40 U.S. Mesh size [0.838 to 0.432 mm] is selected on anticipated wormholing potential or simply on availability. Size is chosen so as to preferentially block wormholes and crevices, but not the smaller fractures, which the large fibers or particles cannot enter. Although we recite the initial and end of a range, we intentionally include all subranges therein.

In more detail, the invention can be described as including any one or more of the following embodiments, in any combination thereof:

An improved method of acid fracturing a reservoir wherein a carbonate reservoir is fractured and said fractures are etched with an acid pad, the improvement comprising alternating slurry pads with acid pads, said slurry pads comprising a slurry of water and a dissolvable material of a size larger than a fracture size, so as to preferentially block wormholes and/or crevices, but not fractures.

A method of acid fracturing a carbonate reservoir, said method comprising:

a. Pumping a viscous pad fluid into a carbonate reservoir at a pressure exceeding a fracture pressure of said carbonate reservoir to fracture said carbonate reservoir, some fractures being of a width ≤D. Crevices or wormholes of width ≥1.2D may also be present or created with each acid treatment. The crevices can also be wider, ≥1.5D, ≥2D, ≥3D or larger.

b. Pumping a slurry containing water plus gel plus a dissolvable fiber or dissolvable particulate material, or both, of a size ≥1.2D or about an average crevice size, into said carbonate reservoir at a pressure exceeding said fracture pressure, said slurry preferentially restricting the fluid entry into said crevices but not said fractures.

c. Pumping an acid downhole at a pressure exceeding said fracture pressure to preferentially etch said fractures.

d. Repeating steps b) and c) as needed, so that said carbonate reservoir has higher conductivity than a similar reservoir similarly fractured, but without said slurry.

A method of producing hydrocarbon from a carbonate reservoir, said method comprising:

a. Pumping a viscous pad fluid downhole into a carbonate reservoir at a pressure exceeding a fracture pressure of said carbonate reservoir to produce fractures. Crevices, wormholes, and the like, that are wider than the fractures and may be orthogonal thereto may also exist pre-fracture, or can be produced by the fracturing or by the acid etching process.

b. Pumping a slurry of water plus a dissolvable fiber and/or dissolvable particulate material downhole at a pressure exceeding said fracture pressure, said slurry preferentially blocking said crevices and/or wormholes, but not said fractures, wherein dissolvable fiber and/or dissolvable particulate material will dissolve in water or acid under reservoir conditions in less than a week, or less than 48 hours, preferably less than 36 or 30 hours, or in about 24 hours.

c. Pumping an acid plus a friction reducer downhole at a pressure exceeding said fracture pressure to preferentially etch said fractures, wherein said acid penetrates deeper into said carbonate reservoir than it would if fractured in a similar method without said slurry.

d. Repeating one or more of these steps as needed to further acid fracture said carbonate reservoir.

e. Dissolving said dissolvable fiber and/or dissolvable particulate material, and f. Producing hydrocarbon from said carbonate reservoir.

A method as described herein, further comprising a step of pumping a cooling fluid downhole before step a) to reduce a temperature of said carbonate reservoir.

A method as described herein, wherein said acid is a slick acid comprising a fraction reducer plus an acid.

A method as described herein, wherein said viscous pad fluid and said slurry are pumped into said carbonate reservoir at the same time, or partially at the same time, or said viscous pad fluid is pumped into said carbonate reservoir before said slurry.

A method as described herein, wherein said slurry is pumped into said carbonate reservoir before each acid stage, or together with each acid stage, or both.

A method as described herein, wherein i) increasing concentrations of dissolvable fiber or particulate material in said slurry are used in each subsequent repetition, or ii) increasing volumes of said slurry are used in each subsequent repetition, or both i) and ii).

A method as described herein, wherein said dissolvable fiber or particulate material comprises polylactic acid (PLA) or poly-glycolic acid (PGA) or derivatives thereof, preferably in the form of fibers or particles of greater than 5 or 10 mesh and less than 100 or 150 mesh, more preferred from 20-40 mesh. The dissolvable material can preferably be used at about 25 to 75 lbm/Mgal, or more preferred at about 30 to 40 lbm/Mgal.

Although PGA and PLA may be preferred, the dissolvable solid material can be many materials, and can be selected from substituted and unsubstituted lactide, glycolide, polylactic acid, polyglycolic acid, copolymers of polylactic acid and polyglycolic acid, copolymers of glyco acid with other hydroxy-, carboxylic acid-, or hydroxycarboxylic acid-containing moieties, copolymers of lactic acid with other hydroxy-, carboxylic acid-, or hydroxycarboxylic acid-containing moieties, and mixtures of such materials.

Synthetic fibers may also be used, but many such polymers will need to be modified in order to have the requisite dissolution characteristics. In addition to dissolvable synthetic fibers, such as modified acrylates, acrylamides, polyglycerides, polyethylene glycols, polyesters, vinyls, urethanes, and the like, natural fibers may also comprise all or a portion of the dissolvable fibers. Such fibers include cellulose, hydroxymethylcellulose, starch, gelatins, agar, pectin, gum, whey protein, soy protein, keratin, glucagons, gluten, lignins, and the like.

Preferably, a mixture of dissolvable fibers and dissolvable particulates (solids) are used herein. A mixture is preferred over just one type of material, as it makes the plugging and leak-off efficiency not only higher, but also much quicker. Particles alone or fibers alone take longer to bridge crevices as the former will traverse the gaps and the latter will tend to deform or coil up. Used together, however, the fiber will form a mesh/network trapping the particulates, causing more rapid blocking.

In addition, the presence of fiber slows down the settling of the particles. A quickly settling solid particle (especially in low viscosity acid) will not provide much benefit, as it may just bank at the bottom of fracture instead of attempting to bridge the wormholes in the walls of the fracture.

The most important aspect is that most (>80%) or all dissolvable material thus introduced should dissolve to keep any plugging from being permanent. Many such as acrylic or other relatively inert materials may not go away in a timely fashion, although typically derivative or crosslinks can be designed to improve the dissolution characteristics on what is normally thought of as a long-lived polymer.

Technology that is pumped as a liquid on surface, but forms fibers bottomhole, may also be useful in the invention.

Any acid can be used herein, although low viscosity slick acid is preferred to enhance the performance of leak-off control or bridging agents such as mentioned here. Slick acid is an acid with a friction reducer added (along with other necessary additives) to lower the frictional pressures during pumping process. 15 to 28% hydrochloric acid (HCl) by weight is routinely used in acid fracturing process, although other acids such as acetic, sulfamic, formic, or hydrofluoric acid are also used occasionally, in varying concentrations.

Acetic acid ($CH_3COOH$) is a weakly-ionized, slow-reacting organic acid. A thousand gallons of 10% acetic acid will dissolve about 704 lb. of limestone. The cost of dissolving a given weight of limestone is greater with acetic acid than with HCl acid. However, acetic acid is relatively easy to inhibit against corrosion and can usually be left in contact with tubing or casing for days without danger of serious corrosion. Because of this characteristic, acetic acid is frequently used as a perforating fluid in limestone wells. Other advantages of acetic acid in comparison to HCl acid are:

1. Acetic acid is naturally sequestered against iron precipitation.
2. It does not cause embrittlement or stress cracking of high strength steels.
3. It will not corrode aluminum.
4. It will not attack chrome plating up to 200° F.

Formic acid (HCOOH) is a weakly-ionized, slow reacting organic acid. It has somewhat similar properties to acetic acid. However, formic acid is more difficult to inhibit against corrosion at higher temperatures and does not have the widespread acceptance and use of acetic acid.

Sulfamic acid, a granular-powdered material, reacts about as fast as HCl. The primary advantage of sulfamic acid is that it can be hauled to the location as a dry powder and then mixed with water. Unless sulfamic acid is modified, it will not dissolve iron oxides or other iron scales. Because of its molecular weight, the amount of calcium carbonate dissolved by one pound of sulfamic acid is only about one-third that dissolved by an: equal weight of HCl acid, thus acidizing with sulfamic acid is normally much more expensive than with HCl acid. Sulfamic acid is not recommended for temperatures above 180° F. because it will hydrolyze to form sulfuric acid. When $H_2SO_4$ reacts with limestone or $CaCO_3$ scale, calcium sulfate will be precipitated, damaging the formation.

In some instances, HCl or other acids can be combined with a mud acid, or hydrofluoric acid (HF), and used to dissolve quartz, sand and clay from the reservoir rocks.

The use of acid can create several well problems. Acid may (1) release fines that plug the formation, (2) form emulsions, (3) create sludge, and (4) corrode steel. Additives are available to correct these and a number of other problems. Corrosion inhibitors, demulsifiers, surface tension reducing agents, chemical retarding agents, clay stabilizers, friction reducers and other additives referred to above may be incorporated in the acid solutions if desired. Care should again be taken that the additives are compatible with the acid, as well as with the dissolvable solids material. Some commonly used additives are described below:

Surfactants: Surfactants are used in acid treatments to reduce surface and interfacial tension, to prevent emulsions, to water wet the formation, and to safeguard against other associated problems. Swabbing and clean-up time after acidizing oil and gas wells can be reduced by lowering surface tension.

Suspending Agents: Most carbonate formations contain insoluble material which can cause blocking in formation pores or fractures if the fines released by acid are allowed to settle and bridge. Suspension should be differentiated from dispersion. Dispersed particles usually settle in a short time. Clean-up after fracture acidizing can be accelerated by use of a suspending agent.

Sequestering Agents: Sequestering agents act to complex ions of iron and other metallic salts to inhibit precipitation of iron as HCl is spent. During acidizing if hydrated oxides of iron are not prevented from dropping out, these insoluble iron compounds may be re-deposited near the wellbore and cause permanent plugging. Sequestering agents should always be used if rusty tubing or casing is to be contacted.

Anti-Sludge Agents: Some crudes, particularly heavy asphaltic crudes, form an insoluble sludge when contacted with acid. The primary ingredients of a sludge are usually asphaltenes, but sludges may also contain resins and paraffin waxes, high-molecular weight hydrocarbons, and formation fines or clays. Addition of certain surfactants can prevent sludge formation by keeping colloidal material dispersed.

Corrosion Inhibitors: Corrosion inhibitors temporarily slow down the reaction of acid on metal, thus protecting equipment. Corrosion inhibition time varies with temperature, acid concentration, type of steel, and inhibitor concentration. Both organic and inorganic corrosion inhibitors have application in acidizing. Some organic inhibitors are effective up to the 300° F. range. Extenders have been developed to increase the effective range to 400° F. Inorganic arsenic inhibitor can be used up to at least 450° F.

Alcohol: Normally methyl or isopropyl alcohol in concentrations of 5% to 30% by volume of acid, is mixed with acid to lower surface tension. The use of alcohol in acid will accelerate the rate of well clean-up and improve clean-up, particularly in dry gas wells. Disadvantages are increased inhibitor problems and possible salt precipitation.

Fluid Loss Control Agents: Fluid loss control agents in addition to the dissolving fibers or particulates may be of further benefit. The preferred method of selecting fluid loss control agents is to run fluid loss tests on core samples from the formation to be acidized in order to select optimal agents or a given formation.

Diverting Agents: Acids will usually follow the path of least resistance, usually the lesser damaged intervals, unless diverting or bridging agents are employed to allow relatively uniform acidizing of various porous zones open to the wellbore. As the acid spends and creates wormholes, a preferential path is established that can lead to potential by-pass of regions that were not exposed to acid initially. Introduction of solid material can "block" the pathways, thus diverting the acid to other regions. In the current invention, by contrast, the objective is to block the wormholes so that the acid can traverse further down the fracture, rather than spending in the near-well region or in the region with dense wormholes. By preventing the acid leak-off into the wormholes, the penetration length of acid in the fracture (or fracture etched length) is enhanced, and hence this mechanism is not purely an "acid-diversion" technique, as fracture walls and not new regions of rock matrix are targeted for acid spending.

As used herein, a fiber is generally longer than wide, e.g., at least 3-5× as long as wide (e.g., much longer in one dimension than the other two), and preferably tens and hundreds of times longer. A particulate, by contrast, is roughly about as wide as long, though deformations less than 3× are included herein (e.g., 1×1×2.9).

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following definitions may be used herein.

| Term | Explanation |
| --- | --- |
| Hydrolyzable | Material that breaks down and/or decomposes when it comes in contact with water. Preferably, degradation occurs by hydrolysis of material in water or acidic water and does not exceed 48 hrs, preferably 36 hrs or even 30 hours when reservoir temperatures are 225° F. [107° C.] or higher. |
| Dissolvable Particles and/or Dissolvable Fibers | Materials in the shape of particles or fibers, that dissolve in a given medium such as water or acidic water. The dissolvable solids used in the context herein can be off-the-shelf materials, such as poly-lactic acid (PLA), poly-glycolic acid (PGA), etc. |
| Particulate matter or particles | Solid particles of varying sizes, for example defined by U.S. Mesh size of 20/40, 16/30, 30/50,100 mesh etc. Likeness with "proppant" is not inferred here because the materials used herein are dissolvable, and therefore will not have the long lifespan needed for proppant use. |
| Polymeric Gel | A polymeric gel is generally constructed by adding water to dry polymer (fine solid particles) or to polymer concentrate slurry and traditionally used in hydraulic fracturing operations. Typical gels would be guar-based gelling agents. |
| Linear or Cross-linked Gels | Linear implies the gel has not been "cross-linked" and will exhibit lower viscosity at given shear rates, as compared to cross-linked gels that generate high viscosity after long chain polymers are inter-linked with the help of cross-linking agents. |
| Visco-elastic fluids | These fluids exhibit characteristics of viscous fluids with elastic behaviour as shear is applied to them. Generally, they are solids free, implying that solid particles like guar solids are not used to generate the gel. |
| Proppant | Solid spherical (rounded), rod-shape, angular and/or other particles that are pumped in hydraulic fracturing treatment to keep the fracture faces "propped-up" and prevent complete "closure" of fracture after the pumping pressures are removed. Proppants are generally not used in acid fracturing stimulations. |

-continued

| Term | Explanation |
| --- | --- |
| Acid | One of the principle components of acid fracturing stimulation treatment that is used to react with limestones/carbonates in the rock matrix and dissolve it to generate fracture conductivity. All "acids" used herein were varying concentrations of HCl, though the technique could be applied for any of the organic or inorganic acids available for oilfield use. Example of organic acids used in oilfield industry - acetic acid, formic acid, lactic acid, benzoic acid, citric acid, etc. |
| Slick Acid | An acid to which a friction reducer has been added. Examples of friction reducers are polymers in the family of polyacrylamide, AMPS (2-Acrylamido-2-methylpropane sulfonic acid) and others. These materials tend to reduce the drag forces associated during fluid flow conditions, thereby reducing tubular frictional pressures. |
| Inhibited or Delayed Acid | The method by which the spending of acid on limestone or carbonates is inhibited or delayed minimizing immediate spending of acid. |
| Cooldown | Process by which the formation temperature is lowered by pumping adequate fluid amounts while monitoring the bottomhole temperatures. Cool temperature slows the rate of acid etching. |
| Friction Reducer | Materials such as polyacrylamide or AMPS (2-Acrylamido-2-methylpropane sulfonic acid) that are traditionally used in the industry to lower the friction. |
| D-FLAC | An abbreviation for "Dissolvable Fluid Loss Control Additive". |
| Crevice | Any large opening or wormhole that allows leak-off of acid etching fluids. The crevices are preferentially blocked herein, allowing the acid to target and deepen existing fractures. |
| lbm/Mgal+ | Pound mass per 1000 gallons |

DESCRIPTION OF FIGURES

FIG. 4. Typical Acid Fracturing Treatment. A common pump schedule includes the pumping of an initial, highly viscous pad stage to create the fracture geometry. A stage of acid follows the pad stage, creating the etched width and fracture conductivity. The acid, however, is reactive and less viscous. It will leak-off quickly and the fracture may close. Therefore, acid fracturing treatments include alternating pad and acid stages with a final flush stage after the last pumped acid stage, protecting the wellbore from long term acid exposure and minimizing the potential for corrosion in the tubulars.

DETAILED DESCRIPTION

Subterranean hydrocarbon bearing formations are routinely fracture stimulated to enhance well productivity and improve well performance. In acid fracturing, as described above, a non-reactive fluid often termed as "pad" is pumped under high pressure down the well tubular into the hydrocarbon-bearing formation to generate a hydraulic fracture.

After the creation of fracture, acid is introduced in the formation to react on the walls of fracture and generate an uneven spending pattern that will result in a non-uniform fracture face. The acid stages are often smaller in volume than pad stages, and apart from reacting with fracture walls, may also "wormhole" into the formation via fracture face in a plane orthogonal to fracture. This phenomenon leads to increased opportunity for fluid to leak away from the fracture face into the adjacent rock instead of traversing down the fracture, which will not benefit productivity in low permeability limestone or chalk formations.

Figure 4:
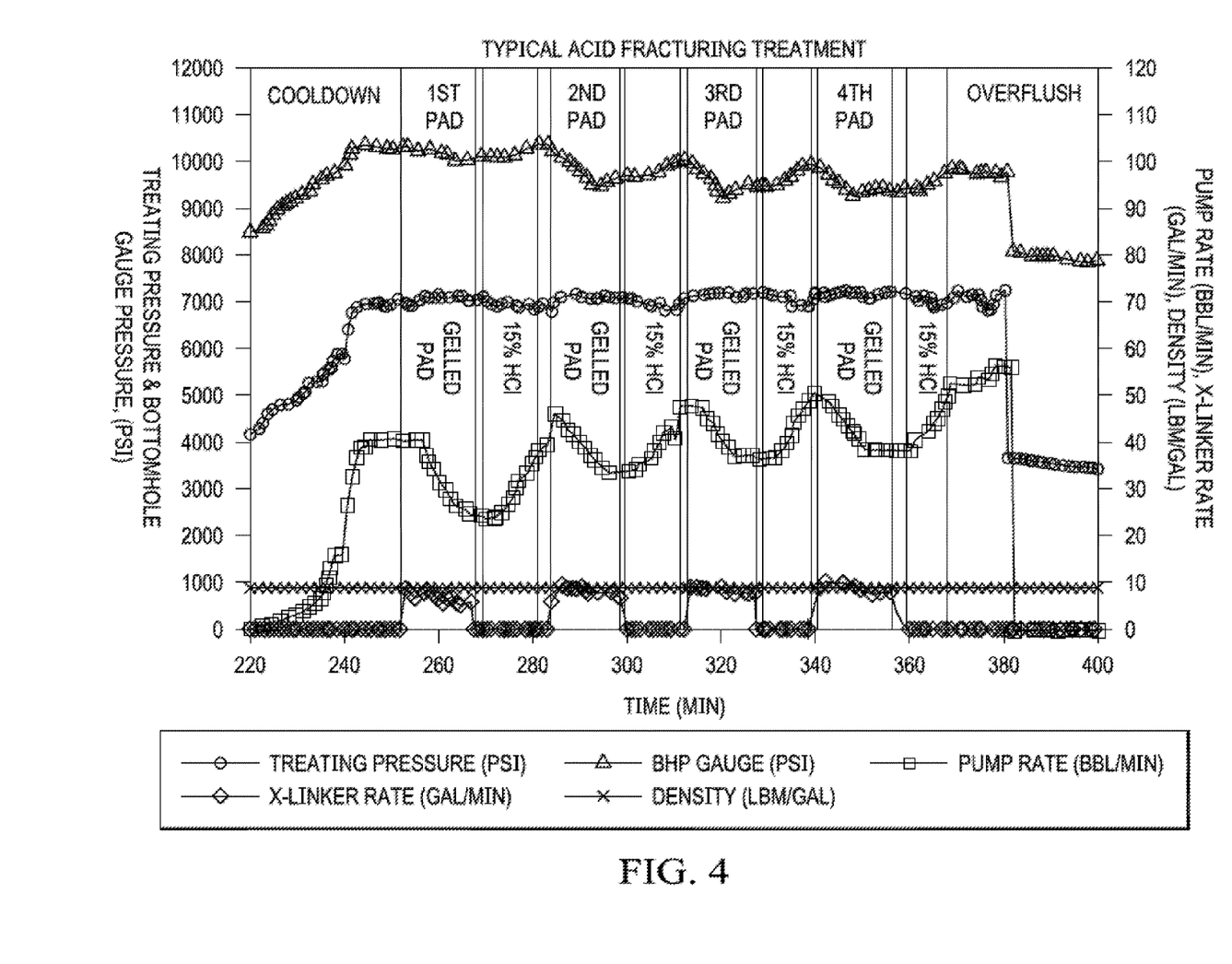

To control this, another pad stage is introduced with a purpose of first controlling some of the leak-off and then extending the fracture even further. The pad/acid alternating sequence are pumped until the treatment objectives are met. Eventually, when such a "differentially" etched fracture face closes after the pumping pressures are removed, it leaves behind conductive pathway that enables flow of fluids (oil/gas/condensate, etc.) into the well with relative ease, during the production phase. FIG. 4 shows one such typical plot of acid fracturing in multiple stages.

In FIG. 4, the enhancement of near well region leak-off resulting from acid-mineral reaction is often detrimental to etched fracture geometry as shorter penetration lengths and smaller etched fracture heights may result because of acid's inability to travel further away from the point of injection. The "thieving" of acid in the near well region must be prevented.

Figure 5:
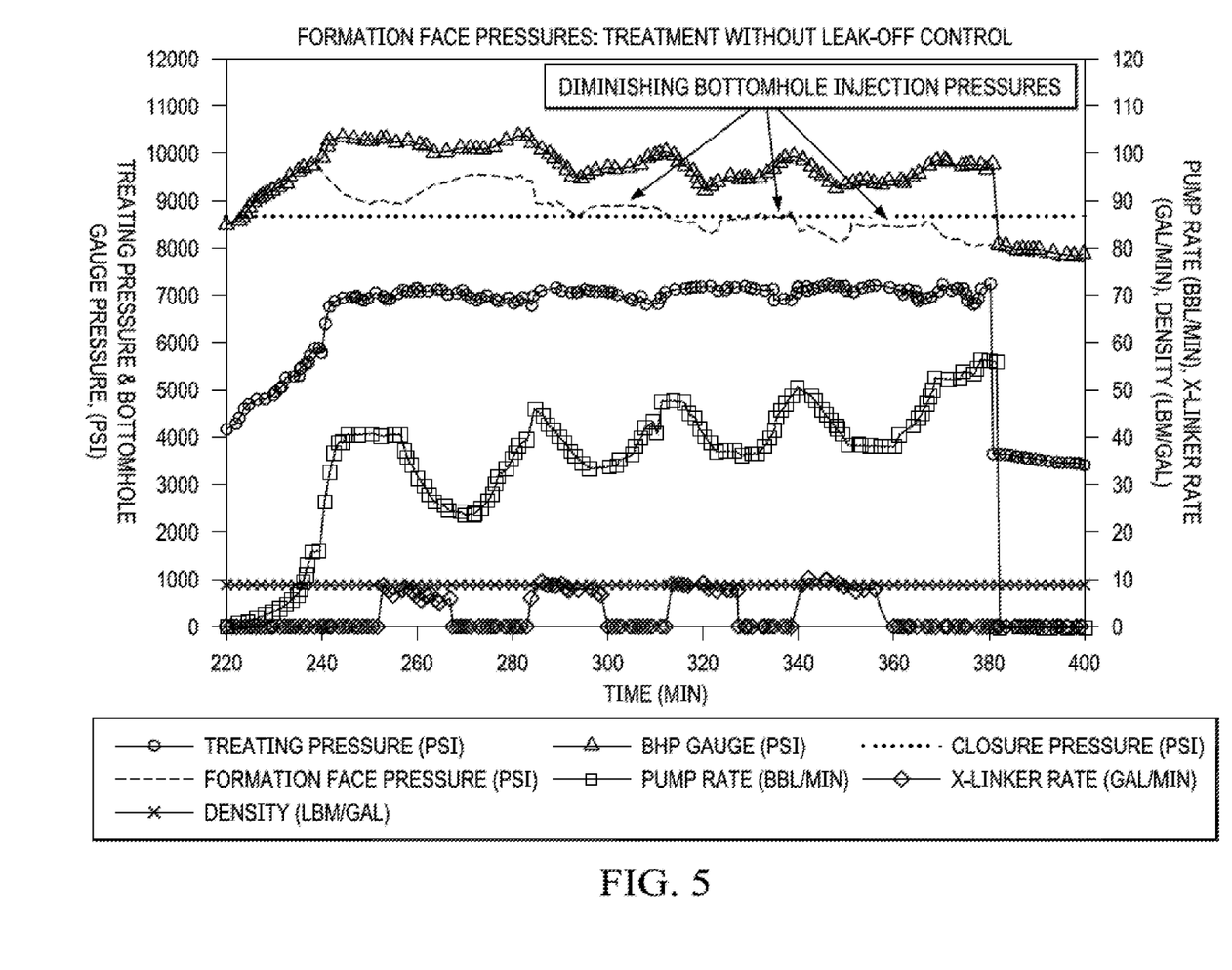
FIG. 5. Plot showing typical treatments that are pumped without leak-control materials that result in continuous reduction of bottom hole injection pressures in successive pad cycles, because the formation leak-off is not readily controlled by pad alone.

FIG. 5 shows the pressure response analysis from treatment showed in FIG. 4. The continuously diminishing formation face pressure is a strong indicator of enhanced leak-off after every acid cycle reacts with the formation.

We have addressed the leak-off problem by developing technology that utilizes available hydrolyzable materials (materials that will decompose in water after a certain exposure time) to plug leak-off of acid into the formation. This limits overspending of the acid in the near wellbore region in all acid cycles and promotes acid placement to the farthest (deepest) points in the fracture network.

We generally begin by carrying out injectivity tests to determine the extent of leak-off by measuring the pressure decline. Depending on the degree of leak-off determined from the pressure fall-off or if estimation of leak-off is already done from previous injections in the area, the treatment design will be based on any of the following methods.

Technique A:

Recommended to be used if the leak-off coefficient is more than 0.0045 ft/min$^{0.5}$ (high).

Start the treatment by pumping a "cooldown" stage to lower reservoir temperature, as needed. Around 300 bbls of cool friction reducer laden water is sufficient for the purpose of cool down, depending of course on well length and downhole temperatures. We prefer to call this a "cooling-down" stage as the primary purpose of this batch of fluid is to lower the near-well temperature in order to slow down acid spending speed.

This is followed by linear or cross-linked gel pad of pre-determined volume, either polymeric or visco-elastic fluid, anything that provides sufficient viscosity and enables the creation and propagation of the desired fractures. It is known in the art how to select pad fluid, volumes and pump pressures to influence fracture size, depth and propagation.

The pad is then followed with a slick acid stage (generally 15 or 28% HCl or any of the organic acids, individual or in mixture) consisting of acid (un-inhibited or inhibited—with all relevant additives) along with a friction reducer. Friction reducers are commercially available and concentrations may range from 0.75 to 3.0 gal/Mgal [0.75 to 3.0 L/m$^3$] depending on optimality of performance. The acid fracturing step occurs at volumes of about 100 to 500 gal [1.24 to 6.2 m$^3$] of acid per foot [meter] of producing formation, and typically is done above the fracture pressure of the formation.

The slick acid stage is followed with a D-FLAC stage, comprising a slurry constructed out of dissolvable fiber and/or dissolvable particulates in a carrier fluid of linear gel made from dry polymer or gel concentrate, to effectively yield concentrations such as 30 to 40 lbm/Mgal (amount of polymer by weight in pounds in 1000 US gallons of water).

The D-FLAC stage inhibits formation fluid leak-off in following steps: 1. Efficiently transported downhole and remaining fully suspended during the process because of the viscosity of carrier gel. 2. Enter the wormholes/bridge at the throat of the wormholes and other cracks/crevices in the formation. 3. Prevent further entry of the subsequent fluids (acid) into the blocked wormholes and other cracks/crevices. 4. Enabling the subsequent fluids to traverse down and finger through the fractures, thus etching and deepening the fractures.

The invention differs from fluid loss control through formation of filter-cake. Filter cake occurs in low to medium permeability formation as the filtrate leak-offs off into the formation leaving behind a wall comprising dehydrated polymeric fluid solids that are of the order of microns in size. Higher fluid velocities such as the ones that occur in near the wellbore region during pumping, as the fluid enters the formation, can also erode filter cake and or prevent its formation up to a distance away from wellbore, till favorable conditions are achieved, leading to ineffective fluid loss control. Furthermore, filter-cake formation in heavily fractured, fissured or wormholed formations is difficult because the fluid tends to be "lost" in these larger features in its entirety.

In this application of the use of D-FLAC with acid, no substantial solids other than D-FLAC are used, which because of their larger size, tend to physically "block" the entry of fluid at all plausible sites such as described in sentence above. Thus, the larger leakage sites are blocked. However, the dissolvable material size is selected so it cannot "block" fractures as it will be too large to do so (the hydraulic fracture width is typically in the order of 0.15 to 0.5 inch when being pumped). Preferential blocking of larger wormholes and crevices allows the fluid to travel down and further etch fractures farther away from the wellbore than would be possible without blocking the larger crevices.

To date we have used D-FLAC only in the PAD, and prior to starting the acid etching or after the first etch and before subsequent etches. In this manner, the dissolvable material is included with at least 2 of the 3 gel pads (2nd and 3rd gel pads), for example, up to 50% of each gel pad volume. These trials have already been conducted successfully.

The next step is to start using the dissolvable material in the acid itself, with the help of a carrier fluid such as concentrated gel generally used for frictional reduction purposes. We anticipate that more dissolvable material may be needed in the long run, as the acid is expected to initiate dissolution. Dissolution of D-FLAC is by hydrolysis, which will speed up in presence of temperature and even extreme low pH environment, such as during acid treatment. To mitigate this, however, we may coat the fiber and particulates in a coating that can delay dissolution for a suitable length of time. Such coatings are available or can be designed.

Particulate matter (solids) will also be suspended in the gel and it will be run along with acid such that the effective concentration of the D-FLAC material will be anywhere from 25 to 35 lbm/Mgal downhole. The volumes and rates will be metered accordingly—the D-FLAC material is pumped using a separate pump at about 5-10 or about 7.0 bbl/min max, and acid will be commingled with it downstream at a rate of about 53-60 bbl/min, prior to entering the wellhead.

The process is not diversion because it does not plug all entry points to "divert" the fluid, but only makes the acid more "efficient," allowing it to propagate as any normal fracture would propagate, but making sure it does not leak-off via the larger wormholes and crevices as rapidly during the process. The additional fluid being pumped in the fracture does not create "new" fractures, as would be done in a diversion process, but only to continue to "extend" the already created fractures.

The following variations are also possible:

D-FLAC stage can be introduced in tandem with the second PAD stage: If a cross-linked gel pad is used, then run the D-FLAC slurry in the first 35% of the second PAD cycle. However, if a linear-gel pad is used, then run D-FLAC slurry for the entire duration of the second PAD Cycle.

Additionally:

Start the D-FLAC stage with 35 lbm/Mgal concentration of total solids inclusive of dissolvable fiber and dissolvable particles.

If using a linear gel PAD, increase the D-FLAC stage concentration by 5 lbm/Mgal every linear gel pad cycle going forward.

Follow the D-FLAC stage with an acid stage of twice or more the volume of preceding D-FLAC stage.

If using cross-linked gel in the third PAD stage, increase D-FLAC up to 50% of designed volume of the third PAD. If using a linear-gel PAD, continue running D-FLAC for entire duration of the third PAD.

Repeat the cycles until all designed acid is pumped.

Increase D-FLAC stage volume as necessary.

Technique B:

Recommended to be used if the leak-off is less than 0.0045 ft/min$^{0.5}$ (high) and only a linear gel pad is used, because the leak-off is not high and linear gel with leak-off control will be sufficient to generate and propagate fractures.

Technique B is like Technique A, the difference being that the D-FLAC material is used throughout the treatment, both in PAD and in the slick acid stages. Note that Acid-Linear Gel compatibility must be pre-determined to provide fluid stability (retain linear gel viscosity despite presence of surrounding acid medium).

Increase D-FLAC material concentration and volume as treatment progresses.

Technique C:

Similar to Technique B with following differences:

Alternate D-FLAC/Acid stages more frequently e.g. every 50 to 75 bbls with equal amounts of the volumes with the leak-off material (fiber+solids) running throughout the treatment. We may need specialized equipment to carry this out, which we may be able to influence during design phase. To administer D-FLAC material so frequently, a gate controller and/or automated controller to the upstream (suction side) of fracturing pumps designated to pump D-FLAC may be installed to obviate the manual controls.

The method in any of its variations can provide any one or more of the following benefits:

Improve Fracture penetration

Enhanced rock stimulation

Better production ($$)

Better long-term fracture conductivity as more etching throughout the fracture face instead of near wellbore Mitigate wellbore integrity issues ($$)

Simplify operations

The method can eliminate any one or more of the following:

Intermediate brine cushion

X-linked pad

Need to control the pumping rates to the extent it is done today

Figure 6:
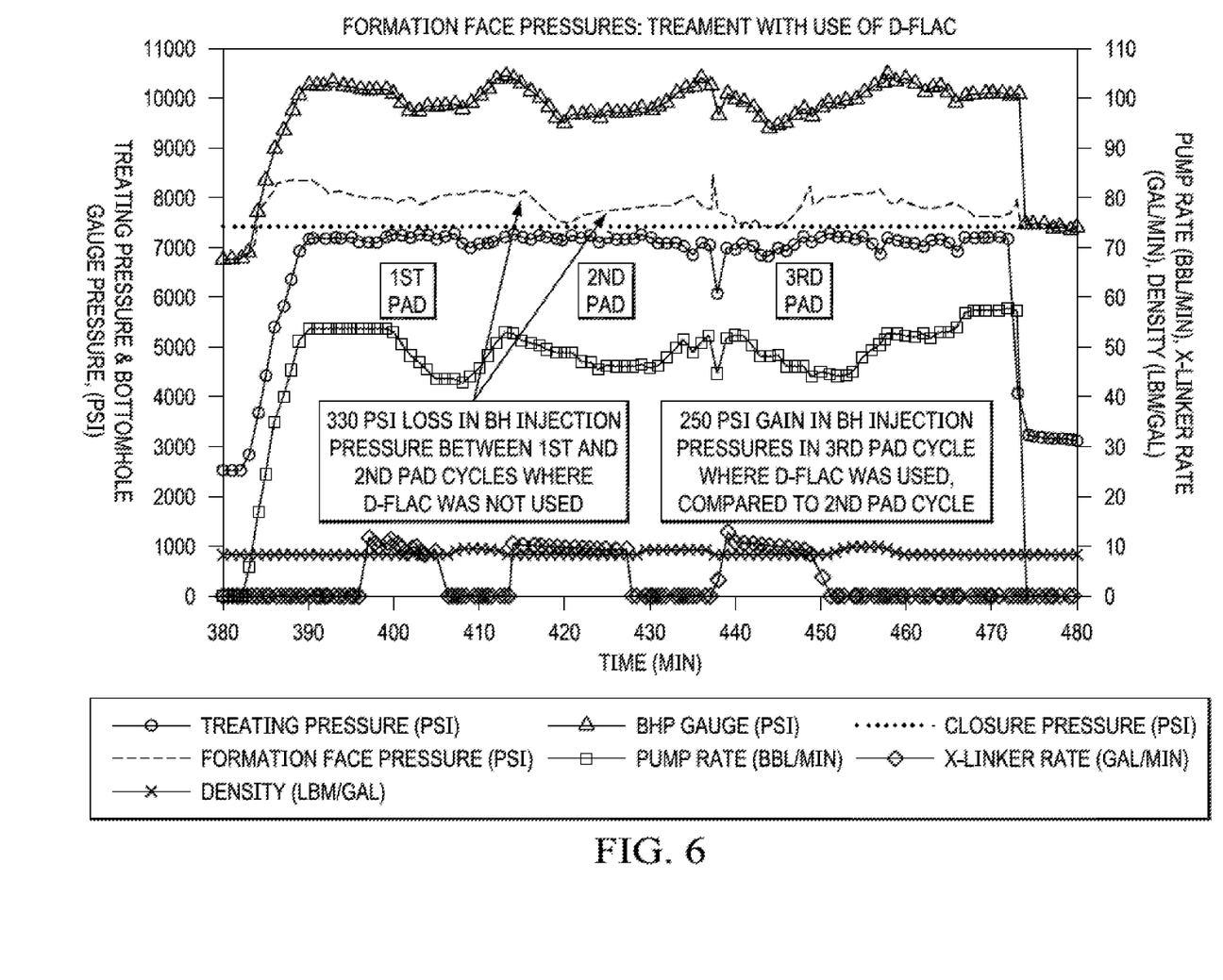
FIG. 6. Plot showing the benefits of using D-FLAC where there is a clear indication of gain of bottomhole pressures after introduction of D-FLAC, which when compared to previous pad cycle points to improved leak-off control.

The data in FIG. 6 was obtained as follows: A polymeric gel or friction reducer laden water fluid was pumped at higher pressures to (a) fracture the rock, and (b) propagate the fracture to generate a desired geometry in two pad cycles. In the third cycle, D-FLAC was pumped in a dedicated "stage" or "pill" using 25 pounds of D-FLAC in 1000 gallons of gel carrier fluid (2.96 kg/m3).

We used a 20/40 U.S. Mesh Size of a PLA polymer indicating a particle size distribution of 0.033 to 0.017 inch [0.838 to 0.432 mm] in the mix. Pump rate was at 60 bbl/min, equivalent to 0.16 cubic meter per second [0.158987 m$^3$/s]. FIG. 6 shows the benefits of using D-FLAC where there is a clear indication of gain of bottomhole pressures after introduction of D-FLAC, which when compared to previous pad cycle, points to leak-off control.

Each of the following is incorporated by reference in its entirety for all purposes.

Williams, B. B., et al., 1979. Acidizing Fundamentals, 55. New York: SPE/AIME.

US2004152601 Generating Acid Downhole in Acid Fracturing

US2015041132 Method of Using Diverter and Proppant Mixture

U.S. Pat. No. 7,219,731 Degradable Additive for Viscoelastic Surfactant Based Fluid Systems

The invention claimed is:

1. A method of acid fracturing a carbonate reservoir, said method comprising:
    a) pumping a viscous pad fluid into a carbonate reservoir at a pressure exceeding a fracture pressure of said carbonate reservoir to fracture said carbonate reservoir, fractures being of a width ≤D;
    b) pumping a slurry containing a gel plus a water-dissolvable fiber and/or water-dissolvable particulate material of a size ≥1.2D into said carbonate reservoir at a pressure exceeding said fracture pressure, said slurry preferentially restricting entry of a fluid into crevices that are larger than D, but not said fractures;
    c) pumping an acid downhole at a pressure exceeding said fracture pressure to preferentially etch said fractures; and
    d) repeating steps b) and c) as needed;
    e) wherein said carbonate reservoir has higher conductivity than a similar reservoir similarly fractured, but without said slurry.

2. The method of claim 1, wherein said acid is a slick acid comprising a friction reducer plus an acid.

3. The method of claim 1, wherein said viscous pad fluid and said slurry are pumped into said carbonate reservoir at the same time.

4. The method of claim 1, wherein said viscous pad fluid is pumped into said carbonate reservoir before said slurry.

5. The method of claim 1, wherein said slurry is pumped into said carbonate reservoir at the same time as said acid.

6. The method of claim 1, wherein i) increasing concentrations of dissolvable fiber or particulate material in said slurry are used in each subsequent repetition, or ii) increasing volumes of said slurry are used in each subsequent repetition, or both i) and ii).

7. The method of claim 6, wherein said water-dissolvable fiber and/or said water-dissolvable particulate material comprises polylactic acid (PLA) or poly-glycolic acid (PGA) or derivatives thereof.

8. The method of claim 6, wherein said water-dissolvable fiber and/or said water-dissolvable particulate material comprises polylactic acid (PLA) or poly-glycolic acid (PGA) or derivatives thereof in the form of fibers or particles of greater than 20 mesh and less than 100 mesh.

9. The method of claim 8, wherein said water-dissolvable fiber and/or said water-dissolvable particulate material is used at about 25 to 75 lbm/Mgal or at about 30 to 40 lbm/Mgal.

10. A method of producing hydrocarbon from a carbonate reservoir, said method comprising:
    a) pumping a viscous pad fluid downhole into a carbonate reservoir at a pressure exceeding a fracture pressure of said carbonate reservoir to produce fractures;
    b) pumping a slurry of gel plus a dissolvable fiber or a dissolvable particulate material downhole at a pressure exceeding said fracture pressure, said slurry preferentially blocking crevices that are larger than said fractures, wherein said dissolvable fiber or said dissolvable particulate material will dissolve in water under reservoir conditions in less than 48 hours;
    c) pumping an acid plus a friction reducer downhole at a pressure exceeding said fracture pressure to preferentially etch said fractures, wherein said acid penetrates deeper into said carbonate reservoir than it would in a similar method without said slurry; and
    d) repeating one or more of these steps as needed to acid fracture said carbonate reservoir;
    e) dissolving said dissolvable fiber and said dissolvable particulate material and flushing said carbonate reservoir; and
    f) producing hydrocarbon from said carbonate reservoir.

11. The method of claim 10, further comprising a step of pumping an acid plus a friction reducer downhole at a pressure exceeding said fracture pressure before step b).

12. The method of claim 10, wherein step a) and b) are partially at the same time.

13. The method of claim 10, wherein step a) and b) are at the same time.

14. The method of claim 10, wherein step b) and c) are partially at the same time.

15. The method of claim 10, wherein step b) and c) are at the same time.

16. The method of claim 10, further comprising a step of pumping a cooling fluid downhole before step a) to reduce a temperature of said carbonate reservoir.

17. The method of claim 16, wherein increasing concentrations of dissolvable fiber or particulate material in said slurry are used in each subsequent repetition.

18. The method of claim 16, wherein said dissolvable fiber and said dissolvable particulate material comprises polylactic acid (PLA) or poly-glycolic acid (PGA) or derivatives thereof.

19. The method of claim 16, wherein said dissolvable fiber or dissolvable particulate material comprises polylactic acid (PLA) or poly-glycolic acid (PGA) or derivatives thereof in the form of fibers or particles of greater than 20 mesh and less than 100 mesh.

20. The method of claim 17, wherein said dissolvable fiber or said dissolvable particulate material is used at total concentration of about 25 to 75 lbm/Mgal.

21. The method of claim 17, wherein said dissolvable fiber or dissolvable particulate material is used at a total concentration of about 30 to 40 lbm/Mgal.

22. An improved method of acid stimulating a reservoir wherein a carbonate reservoir is fractured and said fractures are etched with an acid pad, the improvement comprising alternating or combining slurry pads with acid pads, said slurry pads comprising a slurry of gel plus a dissolvable material of a size larger than a fracture size, so as to preferentially block wormholes and crevices and preferentially etch fractures, said dissolvable material dissolving in water or acidic water in less than 48 hours under reservoir conditions.

* * * * *